United States Patent
Jang et al.

(10) Patent No.: US 7,603,646 B1
(45) Date of Patent: Oct. 13, 2009

(54) METHOD AND APPARATUS FOR POWER OPTIMIZATION USING DON'T CARE CONDITIONS OF CONFIGURATION BITS IN LOOKUP TABLES

(75) Inventors: Tetse Jang, San Jose, CA (US); Kevin Chung, Toronto (CA); Jason H. Anderson, Toronto (CA); Qiang Wang, Campbell, CA (US); Subodh Gupta, Belmont, CA (US)

(73) Assignee: Xilinx, Inc., San Jose, CA (US)

( * ) Notice: Subject to any disclaimer, the term of this patent is extended or adjusted under 35 U.S.C. 154(b) by 204 days.

(21) Appl. No.: 11/820,894

(22) Filed: Jun. 21, 2007

(51) Int. Cl.
*G06F 17/50* (2006.01)
(52) U.S. Cl. .............................. 716/16; 716/17; 716/18; 703/14; 713/300; 713/320; 713/321
(58) Field of Classification Search ............. 716/16–18; 703/14; 713/300, 320–321
See application file for complete search history.

(56) References Cited

U.S. PATENT DOCUMENTS

| | | | | |
|---|---|---|---|---|
| 6,157,903 | A * | 12/2000 | Hu ............................... | 703/14 |
| 6,704,878 | B1 * | 3/2004 | Benini et al. ................. | 713/321 |
| 6,993,737 | B1 | 1/2006 | Anderson et al. | |
| 7,017,043 | B1 * | 3/2006 | Potkonjak ................... | 713/176 |
| 7,188,266 | B1 * | 3/2007 | Mendel et al. .............. | 713/320 |
| 7,260,595 | B2 * | 8/2007 | Talwar et al. ............... | 708/712 |
| 7,287,171 | B1 * | 10/2007 | Mendel et al. .............. | 713/300 |
| 7,360,197 | B1 * | 4/2008 | Schleicher, II et al. ........ | 716/18 |
| 7,467,310 | B1 * | 12/2008 | Mendel ...................... | 713/300 |
| 2004/0153490 | A1 * | 8/2004 | Talwar et al. ............... | 708/700 |

OTHER PUBLICATIONS

B.Kumthekar et al.; "Power optimisation of FPGA-based designs without rewiring"; IEEE Proc.-Comput. Digit. Tech, vol. 147, No. 3, May 2000; pp. 167-174.*

U.S. Appl. No. 10/693,568 by Lysaght et al., filed Oct. 24, 2003 by Xilinx, Inc.

The Donald O. Pederson Center for Electronic Systems Design; "MVSIS: Logic Synthesis and Verification Overview"; downloaded on May 21, 2007 from http://embedded.eecs.berkeley.edu/mvsis/; pp. 1-2.

Alan Mishchenko et al.; "SAT-Based Complete Don't-Care Computation for Network Optimization"; Process Date '05; downloaded on May 21, 2007 from http/www.eec.berkeley.edu/~alanmi/publications/2005/date05_satdc.pdf; pp. 418-423.

Alan Mishechenko et al.; "An Integrated Technology Mapping Environment"; Proc. IWLS '05; pp. 383-390.

(Continued)

*Primary Examiner*—Naum B Levin
(74) *Attorney, Agent, or Firm*—LeRoy D. Maunu; Lois D. Cartier

(57) ABSTRACT

Various approaches for generating an implementation of an electronic circuit design are disclosed. In one approach, one or more configuration bits that have don't care conditions are identified for a LUT block of a design. A dynamic power state for a subset of a first level of logic devices in the LUT block is determined as a function of each identified configuration bit that has a don't care condition. A dynamic power state for a subset of a second level of logic devices is determined as a function of the determined power state for the first level of logic devices. A respective value for each identified configuration bit of the LUT is selected in response to the determined dynamic power states. The respective value is placed into the design for each identified configuration bit.

20 Claims, 8 Drawing Sheets

OTHER PUBLICATIONS

B. Kumthekar et al.; "Power Optimisation of FPGA-Based Designs Without Rewiring"; IEE Proc.-Comput. Digit Tech.; vol. 147, No. 3; May 2000; pp. 167-174.

Balakrishna Kumthekar et al.; "In-Place Power Optimization for LUT-Based FPGAs"; DAC '98; Copyright 1998; pp. 718-721.

U.S. Appl. No. 11/710,096, filed Feb. 23, 2007, Anderson et al.

* cited by examiner

METHOD AND APPARATUS FOR POWER OPTIMIZATION USING DON'T CARE CONDITIONS OF CONFIGURATION BITS IN LOOKUP TABLES

FIELD OF THE INVENTION

One or more aspects of the present invention relate generally to computer-aided design of electronic circuits and, more particularly, to power optimization during an integrated circuit design process.

BACKGROUND

Controlling power consumption has become an important design challenge in modern integrated circuit (IC) devices, such as in programmable logic devices (PLDs) and standard cell application specific integrated circuits (ASICs). PLDs exist as a well-known type of IC that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An example FPGA includes an array of configurable logic blocks (CLBs) surrounded by a ring of programmable input/output blocks (IOBs). CLBs contain look-up tables (LUTs) which are small memories with K inputs capable of implementing any logic function having up to K variables. The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, although other types of memory may be used. The collective states of the individual memory cells then determine the function of the FPGA.

A conventional design process for an integrated circuit, such as an ASIC or an FPGA, begins with the creation of the design. The design specifies the function of a circuit at a schematic or logic level and may be represented using various programmable languages (e.g., VHDL, ABEL or Verilog) or schematic capture programs. The design is synthesized to produce a logical network list ("netlist") supported by the target integrated circuit device. The synthesized design is mapped onto primitive components within the target device (e.g., programmable logic blocks of an FPGA). Placement of the components of the synthesized and mapped design is then performed for the target device. Interconnects (e.g., signal conductors) are routed within the target device for the placed components.

Performance and frequency requirements translate to a maximum allowable delay for paths traversing routing resources between circuit elements. As such, the conventional design process is "timing-driven" in that the process is optimized in accordance with timing constraints. Oftentimes a timing-driven optimization process does not optimize the design for power consumption. In some instances, incorporating power optimization in the conventional design process may adversely affect the timing performance of the design.

A few post-routing power optimization techniques have been explored, but such techniques are often inefficient and require significant computing power and offer less than desirable power savings. Other problems arise due to variable circuit and LUT sizes.

Accordingly, there exists a need in the art for an integrated circuit design process that addresses these and other problems in power optimization including an efficient method that does not adversely affecting the timing performance of the design.

SUMMARY

Various approaches are provided for generating an implementation of an electronic circuit design. In one embodiment, a processor-based method for processing an integrated circuit design is implemented. The design is represented in a memory with a plurality of programmable look-up-table (LUT) blocks, each LUT block having a plurality of logic devices, a plurality of inputs and a plurality of configuration bits that implement a function that is responsive to the inputs. For a LUT block of the plurality of programmable LUT blocks, one or more configuration bits are identified as having don't care conditions. A dynamic power state is determined for a subset of a first level of logic devices in the LUT block as a function of each identified configuration bit that has a don't care condition. A dynamic power state is determined for a subset of a second level of logic devices in the LUT block as a function of the determined power state for the subset of the first level of logic devices. A respective value for each identified configuration bit of the LUT is selected in response to the determined dynamic power states. The respective value for each identified configuration bit is stored into the design.

In another embodiment, an apparatus is provided for processing an integrated circuit design. The apparatus has means for representing the design in a memory with a plurality of programmable look-up-table (LUT) blocks each LUT block having a plurality of logic devices, a plurality of inputs and a plurality of configuration bits that implement a function that is responsive to the inputs; means for identifying one or more configuration bits that have don't care conditions for a LUT block of the plurality of programmable LUT blocks; means for determining a dynamic power state for a subset of a first level of logic devices in the LUT block as a function of each identified configuration bit that has a don't care condition; means for determining a dynamic power state for a subset of a second level of logic devices in the LUT block as a function of the determined power state for the subset of the first level of logic devices; means for selecting a respective value for each identified configuration bit of the LUT in response to the determined dynamic power states; and means for storing, into the design, the respective value for each identified configuration bit.

An article of manufacture, in another embodiment, has a processor-readable storage medium configured with processor executable instructions for generating an implementation of an electronic circuit design. When executed by one or more of the processors, the instructions cause the processor to perform the steps comprising: representing the design in a memory with a plurality of programmable look-up-table (LUT) blocks, each LUT block having a plurality of logic devices, a plurality of inputs and a plurality of configuration bits that implement a function with the LUT block responsive to the inputs; for a LUT block of the plurality of programmable LUT blocks, identifying one or more configuration bits that have don't care conditions; determining a dynamic power state for a subset of a first level of logic devices in the LUT block as a function of each identified configuration bit that has a don't care condition; determining a dynamic power state for a subset of a second level of logic devices in the LUT block as a function of the determined power state for the subset of the first level of logic devices; selecting a respective value for each identified configuration bit of the LUT in response to the determined dynamic power states; and storing, into the design, the respective value for each identified configuration bit.

It will be appreciated that various other embodiments are set forth in the Detailed Description and Claims which follow.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

DETAILED DESCRIPTION OF THE DRAWINGS

Figure 1:
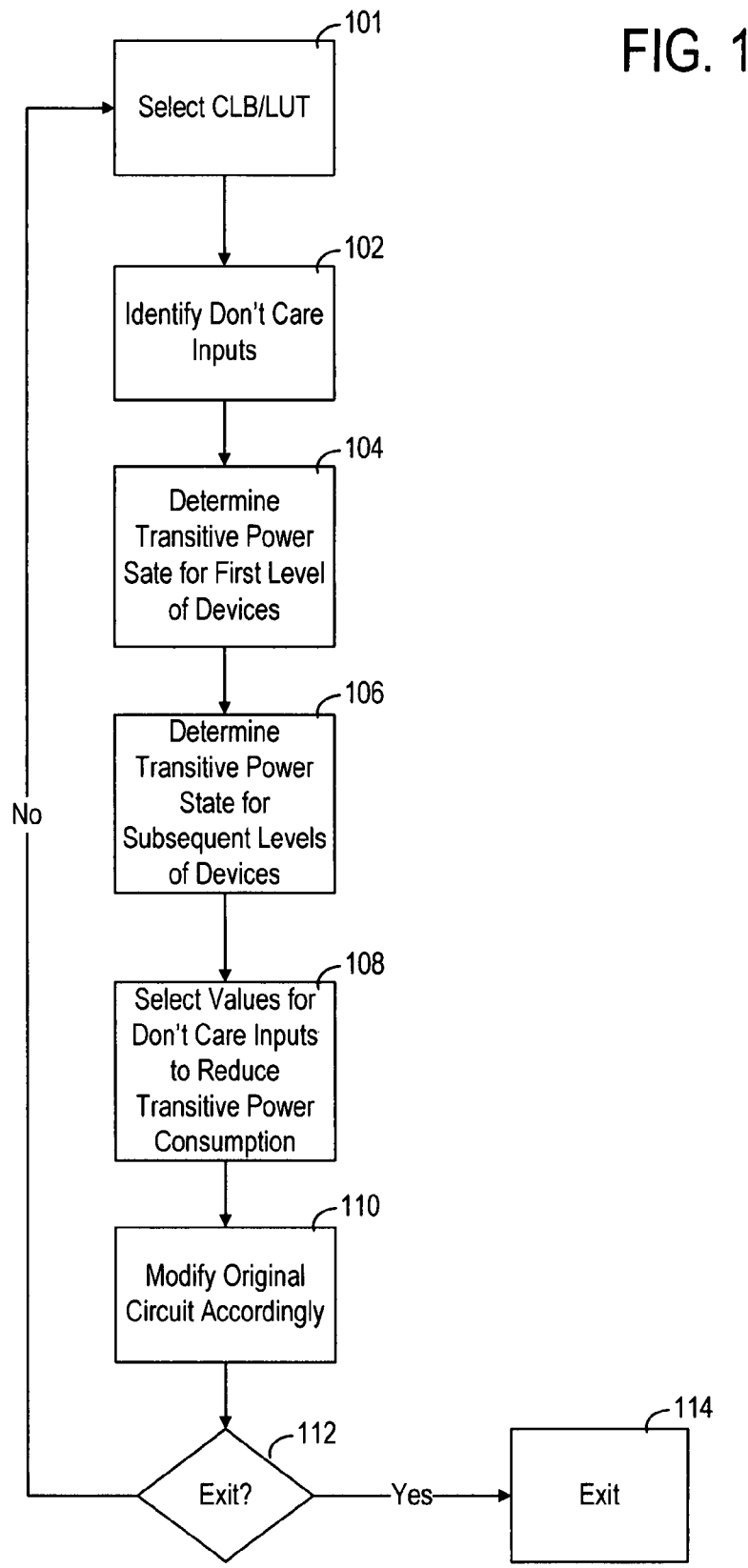
FIG. 1 is a flow diagram depicting a design process incorporating power optimization of an integrated circuit, according to an example embodiment of the invention.

The various embodiments of the invention provide methods and apparatus for optimizing an integrated circuit design. One or more aspects in accordance with the invention are described in terms of a field programmable gate array (FPGA). While specific reference is made to an FPGA, those skilled in the art will appreciate that one or more aspects of the invention may be used for designing other types of integrated circuits, such as complex programmable logic devices (CPLDs), application specific integrated circuits (ASICs), and the like.

Consistent with one embodiment of the invention, a process is implemented for reducing the dynamic power consumption of a programmable logic device. For a placed and routed design, don't care conditions are identified for configuration bits. The processor evaluates the dynamic power consumption for multiplexers that are fed by the configuration bits. Values are selected for the identified configuration bits to reduce the dynamic power consumption.

Consistent with a more specific embodiment of the invention, the process selects values for the identified configuration bits to produce a state in which the output values of multiplexers in the programmable logic device are independent of inputs of the configuration block. This is particularly useful for CMOS-based multiplexers, as the steady-state power draw of most CMOS components is often less than other component types.

The various methods and systems discussed herein may be implemented using specialized software running on one or more general purpose processors. As such, the software may be implemented as a standalone product, or as part of a software suite for designing, synthesizing, simulating and/or programming a programmable logic device.

In one instance, the design may be represented as a Boolean network. A Boolean network is a network in which there is an associated representation of a Boolean function for each node. The dataflow of the graph begins at sources or primary inputs (PIs) and ends at the sinks or primary outputs (POs). Inputs of a node are considered fan-ins of the node, while outputs of the node that connect to another node are considered fan-outs. A node i is a transitive fan-in (TFI) of another node j if there is a path from i to j in the network. A node i is a transitive fan-out (TFO) if there is a directed path from j to i in the network. The local function of a node includes fan-ins that do not have intervening nodes. The global function of a node includes nodes in paths connected to PIs and the node as well as the connected PIs.

A cone of node n is a subset of all nodes of the network reachable through the fan-in edges from the given node. Node n may be called the root of the cone. A fan-out-free cone (FFC) is a cone in which the fan-outs of every node other than the root are in the cone (i.e., they converge to the root). A maximum fan-out free cone (MFFC) of node n is a subset of the fan-in cone, such that every path from a node in the subset to the POs passes through n. For any node, the MFFC of the node is unique. The concept of MFFC is useful because the MFFC of a node contains all the logic used only by the node. Accordingly, when a node is effectively removed or substituted, the logic in its MFFC may also be removed.

The level of a node is the length of the longest path from any PI to the node. The node itself is counted towards the path lengths but the PIs are not. The network depth is the largest level of an internal node in the network. The delay and area of an FPGA mapping is measured by the depth of the resulting LUT network and the number of LUTs in it.

Complete don't care (CDC) conditions arise from two different possibilities sometimes referred to as satisfiability don't cares (SDCs) and observability don't cares (ODCs). SDCs arise because some combinations are not produced at the inputs of the node. For instance, a SDC condition occurs when certain input patterns to a node can not appear due to logical impossibilities. ODCs arise because under some conditions the output of the node does not matter. For instance, for certain primary input patterns, the output of a gate does not affect any of the primary outputs (e.g., it is not observable).

In a specific embodiment of the invention, the process identifies a complete (full) don't care condition. LUT-based CLBs may be selected individually. Such individual selection is particularly useful for minimizing the time that would otherwise be used to select a cluster. The process is iteratively applied to reduce the number of hot nets/resources, where hot nets are those nets with potential for higher dynamic power consumption. If desired, the process proceeds through each node of the design. The process may also be designed to scale for use with any size of LUT.

FIG. 1 shows a flow diagram of a method for optimizing power consumption of a programmable logic device, according to an example embodiment of the invention. The method begins at step 101 where a particular LUT/CLB is selected. At step 102 don't care conditions (CDCs) are identified. In a specific instance, the identified components include configuration bits for use in look up table (LUT) CLB.

At step 104, a process uses the identified CDCs to determine the dynamic power state for a first level of devices. In a specific example, the first level describes device locations relative to the identified CDCs. For instance, in a common LUT-based CLB the configuration bits are connected to a series of multiplexers. The first level of devices would include those multiplexers that receive the configuration bits as inputs. The dynamic power state may represent whether or not the multiplexer changes its output in response to a change to inputs of the CLB.

At step 106, the process determines a dynamic power state for a subsequent level of devices. For instance, in a common LUT-based CLB, the first level of multiplexers is connected to one or more levels of additional multiplexers. In this manner, the second level of devices may have a MFFC consisting of the first level of devices. Depending upon the size of the CLB, there may be any number of additional levels of devices.

At step 108, the process selects values for the identified CDCs that reduce the dynamic power consumption of the various devices. For a LUT-based CLB, the processor may select values of configuration bits that result in multiplexers, with respect to a change in inputs of the CLB, having a constant 1 or 0 as their respective output.

At step 110, the selected values are implemented into the original design. The process then proceeds to step 112 where a decision is made as to whether to exit the optimization process at block 114 or to repeat steps 101-110. Repeating the process may result in additional optimization because the design may change due to various optimizations. As described in more detail herein, the process may be implemented in such a manner that the optimizations performed in each pass improve or maintain the optimization levels reached in previous iterations. The decision as to whether or not to exit may be made based on a number of different criteria including, but not limited to, a set number of passes, meeting some amount of improvement, meeting a level of power consumption, failure to improve significantly after a number of passes and exceeding a time limit.

Figure 2:
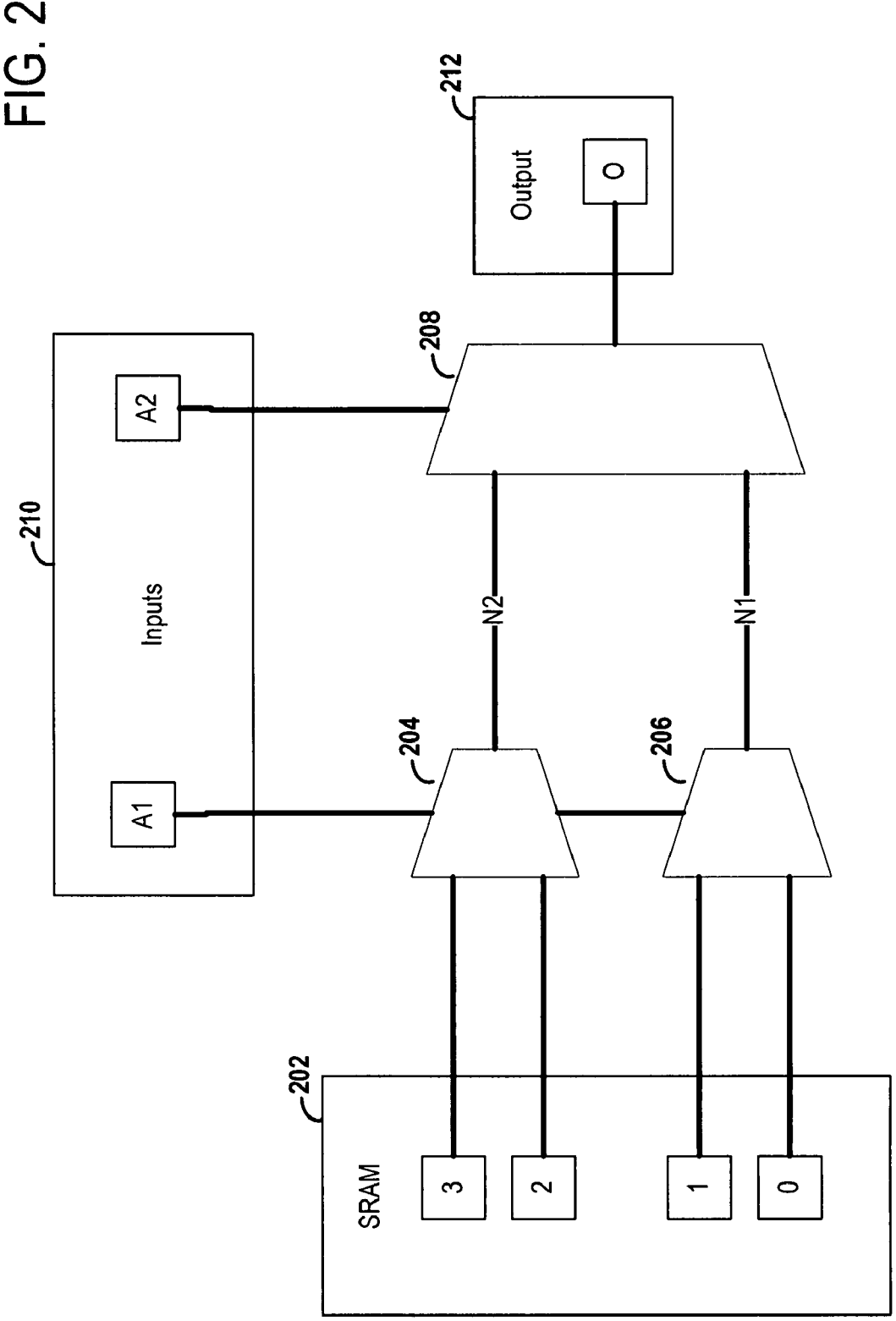
FIG. 2 is block diagram of a LUT block, according to an example embodiment of the invention.

FIG. 2 shows an example LUT-based CLB, used in an example embodiment of the invention. The figure depicts a 2-input CLB having inputs 210, SRAM 202, multiplexers 204-208 and output 212. SRAM 202 stores configurable bits 0-3. These bits are used to provide the desired functional response to inputs 210, which include inputs A1 and A2. Input A1 controls multiplexers 204 and 206, while input A2 controls multiplexer 208. Such a configuration results in the desired functionality appearing at output (0) 212. There are no intervening multiplexers between multiplexers 204 and 206 and the respective configuration bits. For this reason, multiplexers 204 and 206 may be considered primary input (PI) multiplexers. There exists at least one intervening multiplexer (204 and 206) between multiplexer 208 and any of the configuration bits. For this reason, multiplexer 208 may be considered an intermediate (INT) multiplexer.

Dynamic power consumption of PI multiplexers 204-206 may be determined in relation to the state of their outputs relative to a change in input A1. For instance, the output of multiplexer 204 is a function of configuration bits 2 and 3 and input A1. Typically, the values of the configuration bits do not change once the part has been programmed. Thus, the multiplexer is subject to one of four different conditions for bits {3,2}: {0,0}, {0,1}, {1,0} and {1,1}. In terms of dynamic power consumption the 4 input conditions may be grouped into two different categories or power states. The first category includes conditions where the dynamic power consumption is high. This category includes conditions where the configuration bits are not the same (i.e., {0, 1} and {1, 0}). These conditions result in the multiplexer being 'hot' because a change in input A1 results in a transition of the output of the multiplexer from 0 to 1 or 1 to 0. The second category includes conditions where the dynamic power consumption is low. This category includes conditions where the configuration bits are the same (i.e., {0, 0} and {1, 1}). These conditions result in the multiplexer being 'cool' because a change in input A1 does not result in a corresponding change in the output of the multiplexer. Instead, the multiplexer output remains constant because a selection of either of the configuration bits results in the same output.

A third category of dynamic power consumption emerges after CDCs are determined. This category includes any conditions where one or more of the configuration bits are determined to be a CDC. Due to the nature of the CDC bit, the value may be set to either a one or a zero without affecting the functionality of the CLB. Thus, these conditions result in the multiplexer being 'undecided' because whether the multiplexer falls into the hot or cool categories depends upon the selection of the CDC bit.

Dynamic power consumption of INT multiplexer 208 may be determined by dynamic power states of the intervening multiplexers 204, 206. As with the PI multiplexers, the INT multiplexer 208 may be classified in one of three categories that include hot, cool and undecided. In a first category, if any of the intervening multiplexers are hot, the INT multiplexer is considered hot because the output value of the INT multiplexer is not static for all cases. In a second category, if all of the intervening multiplexers 204, 206 are cool and the inputs are the same, the INT multiplexer 208 may be considered cool because the inputs to the multiplexer do not change.

In another embodiment, an INT multiplexer can be considered cool with respect to individual inputs. This can allow for further delineation between the power consumption of the INT multiplexer. For instance, an INT multiplexer may be classified in terms of the percentage of inputs that are considered cool. Thus, the INT multiplexer could be rated as 100% cool if both intervening multiplexers 204 and 206 were cool (cool with respect to A1) and they both had the same static value at their respective output (cool with respect to A2). Likewise, the INT multiplexer could be rated as 50% cool if both intervening multiplexers 204 and 206 were cool (cool with respect to A1), but they had different static values at their respective outputs (hot with respect to A2). This strict percentage is merely representative and may be implemented using variations in the percentage determination. For example, specific implementations may result in inputs located further from the INT multiplexer having more or less effect on the dynamic power consumption with respect to closer inputs. The percent cool could be weighted to compensate for such differences.

In a third category, if one of the intervening multiplexers is undecided and none of the intervening multiplexers is hot, the INT multiplexer is considered undecided because the status of the INT multiplexer is dependent upon the value of CDC configuration bits.

Figure 3:
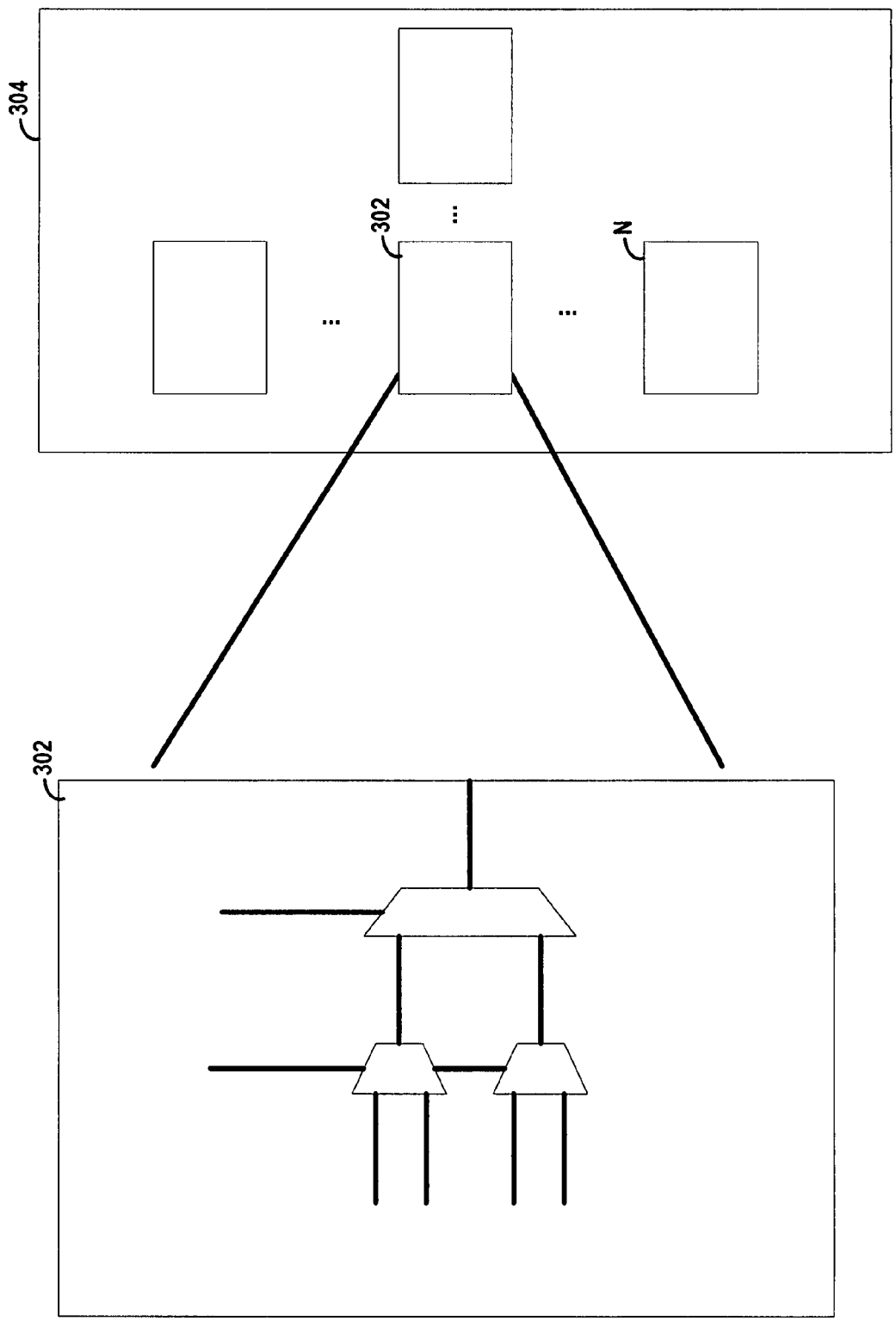
FIG. 3 is block diagram of a LUT block taken from a plurality of LUT blocks, according to an example embodiment of the invention.

FIG. 3 shows a selected CLB block 302 taken from design 304, for use with an embodiment of the invention. CLB block 302 may be selected from design 304, which may contain N blocks. In a particular instance, the selection of blocks may be limited to a subset of the total N blocks. In another instance, each block may be selected and optimized for dynamic power consumption. Moreover, the process may be repeated for some or all of the blocks as desired. This flexibility arises from the ability to independently perform optimization steps on each block.

Figure 4:
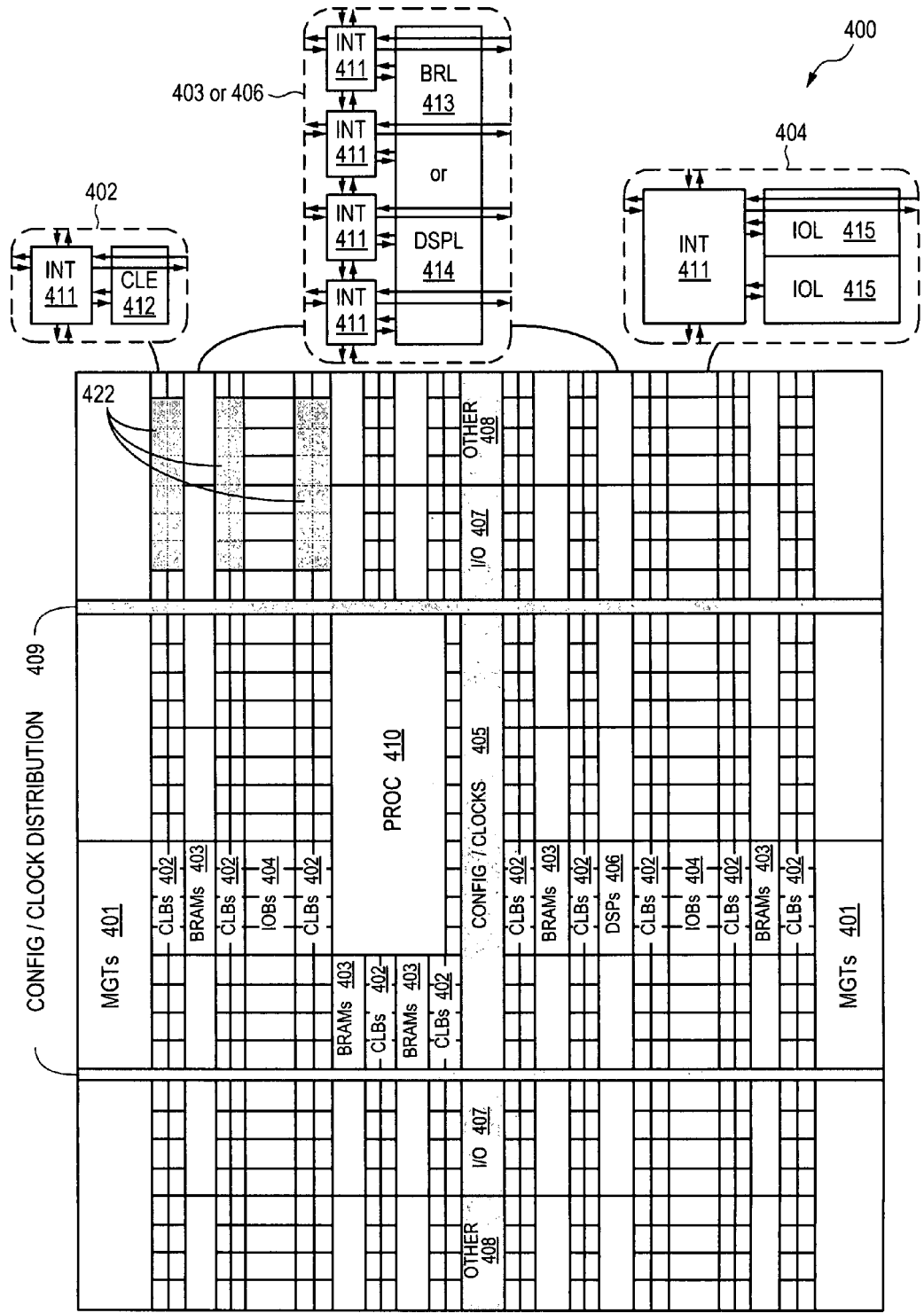
FIG. 4 is a block diagram depicting an exemplary embodiment of a field programmable gate array (FPGA) coupled to a program memory.

FIG. 4 is a block diagram of an example FPGA architecture that may be used in implementing various embodiments of the invention. FPGA architecture 400 includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 may include a configurable logic element (CLE 412) that may be programmed to implement user logic plus a single programmable interconnect element (INT 411). A BRAM 403 may include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) may also be used. A DSP tile 406 may include a DSP logic element (DSPL 414) in addition to an appropriate number of programmable interconnect elements. An IOB 404 may include, for example, two instances of an input/output logic element (IOL 415) in addition to one instance of the programmable interconnect element (INT 411). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a horizontal area near the center of the die (shown shaded in FIG. 4) is used for configuration, clock, and other control logic. Vertical areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks may be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Figure 5A:
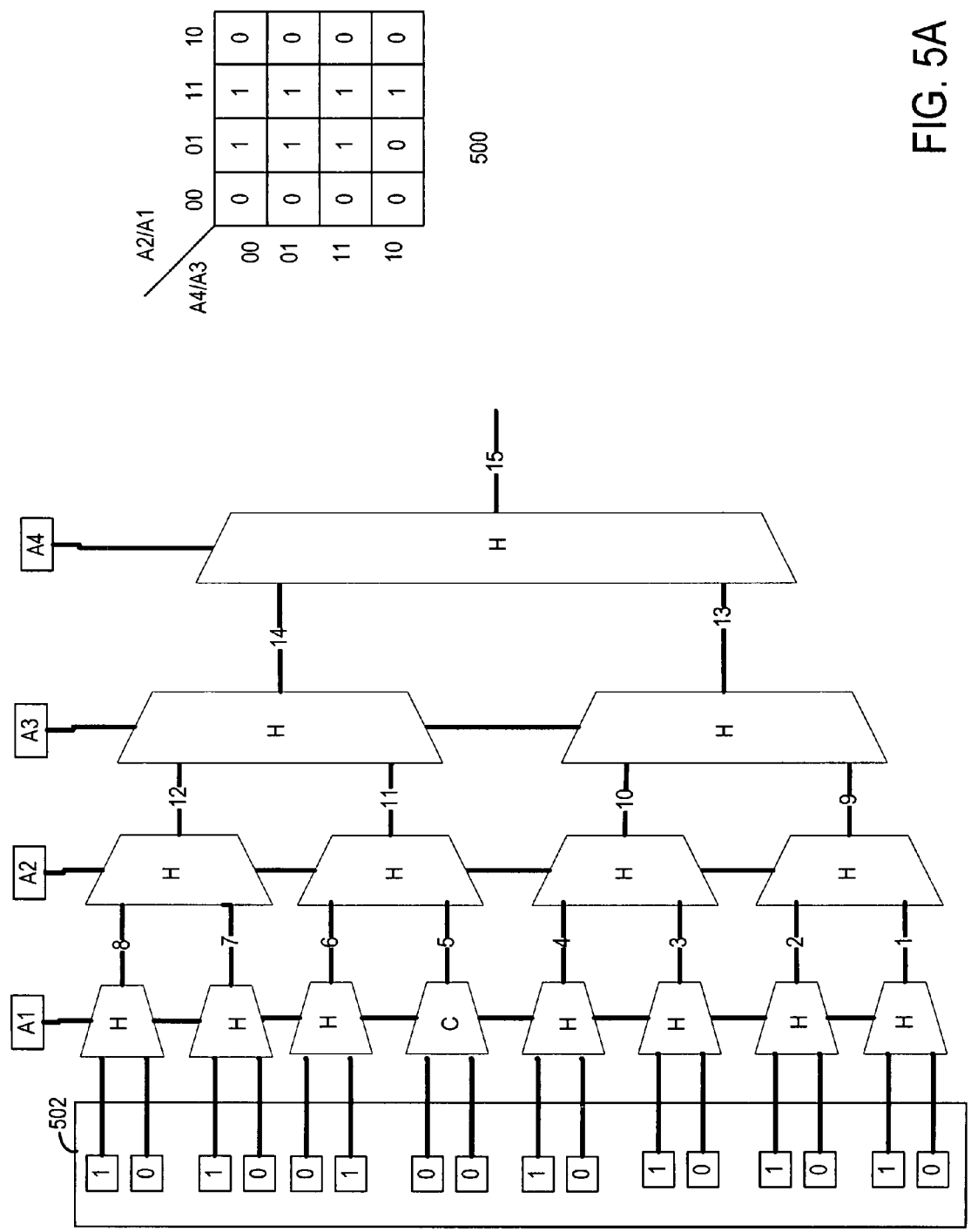
FIG. 5A is a block diagram depicting a representation of a programmed LUT.

FIG. 5A shows an example LUT-based CLB block having four inputs and configuration bits defined by Karnaugh map 500. Karnaugh map 500 shows the functional output with respect to inputs A1-A4. This functionality is implemented by programming the configuration bits 502 as shown. The various multiplexers provide corresponding outputs on wires 1-15. The multiplexers that are considered hot are labeled with an 'H', while the multiplexer that is considered cool is labeled with a 'C'. Using the criteria discussed herein, there is only one cool multiplexer/wire 5. This is because there is only one PI multiplexer with the configuration bits that are the same (i.e., {1, 1} or {0, 0}).

Figure 5B:
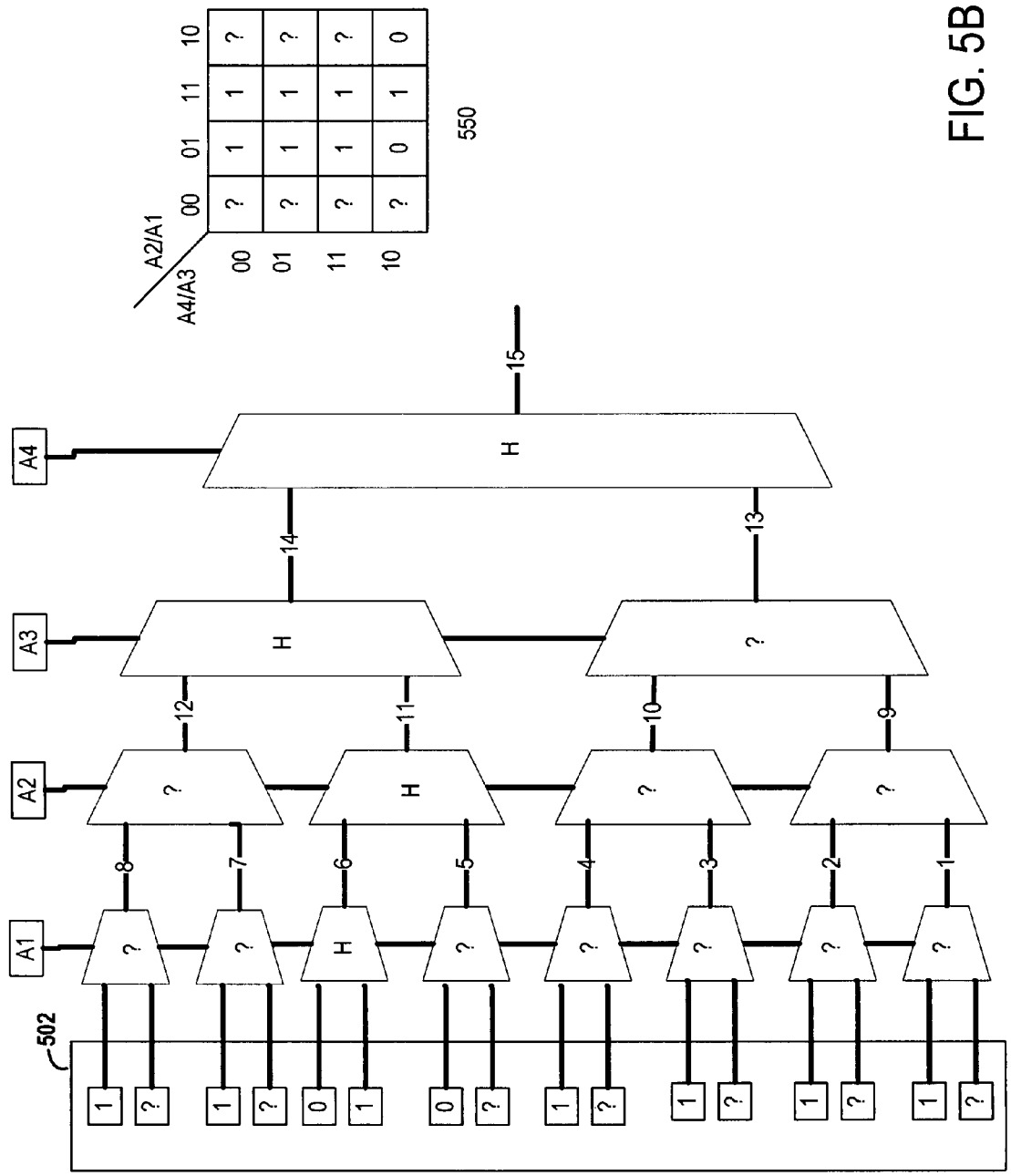
FIG. 5B is a block diagram depicting the representation of the programmed LUT from FIG. 5A with don't care conditions identified.

FIG. 5B shows an example LUT-based CLB block derived from the CLB of FIG. 5A and with flexibility introduced by Karnaugh map 550. Karnaugh map 550 shows flexibility added to the design by the identification of CDCs. This flexibility is shown as a '?' in both the Karnaugh map 550 and configuration bits 502. The power states of the multiplexers may then be redefined accordingly. As shown in FIG. 5B by a '?', there are eleven undecided multiplexers. In this instance, each undecided-PI multiplexer may be made cool by selection of the undecided configuration bits. For instance, wire 1 may be made cool by setting the corresponding, undecided configuration bit to a 1, thereby matching the other configuration bit. Such selection results in nets 1-4, 5 and 7-8 being cool. Using this information, subsequent multiplexers may also be defined as cool. For instance, wires 9, 10 and 12 may each be defined as cool because all intervening multiplexers are cool and have static outputs of 1. Accordingly, wire 13 would also be considered cool because each of wires 9 and 10 are cool and have static outputs of 1. Thus, by taking advantage of flexibility provided by CDCs when moving from FIG. 5A to FIG. 5B, the total number of cool nets may be increased from one to eleven.

Such a process may be further optimized when static-power consumption of the devices is also taken into account. More specifically, the leakage or static power consumption in the circuit is often lower when all of the memory values are either a 1 or 0, depending on the way how the multiplexer is designed. This information may be taken into account in situations where the values of configuration bits do not adversely affect the dynamic power state of the multiplexers. Examples of such situations include, but are not limited to, a don't care configuration bit that is an input to a hot multiplexer, or two don't care configuration bits feeding the same multiplexer. In such situations, the don't care configuration bit(s) can be set to the preferred (e.g., lower) static power consumption value without affecting the dynamic power consumption of the design.

Figure 6:
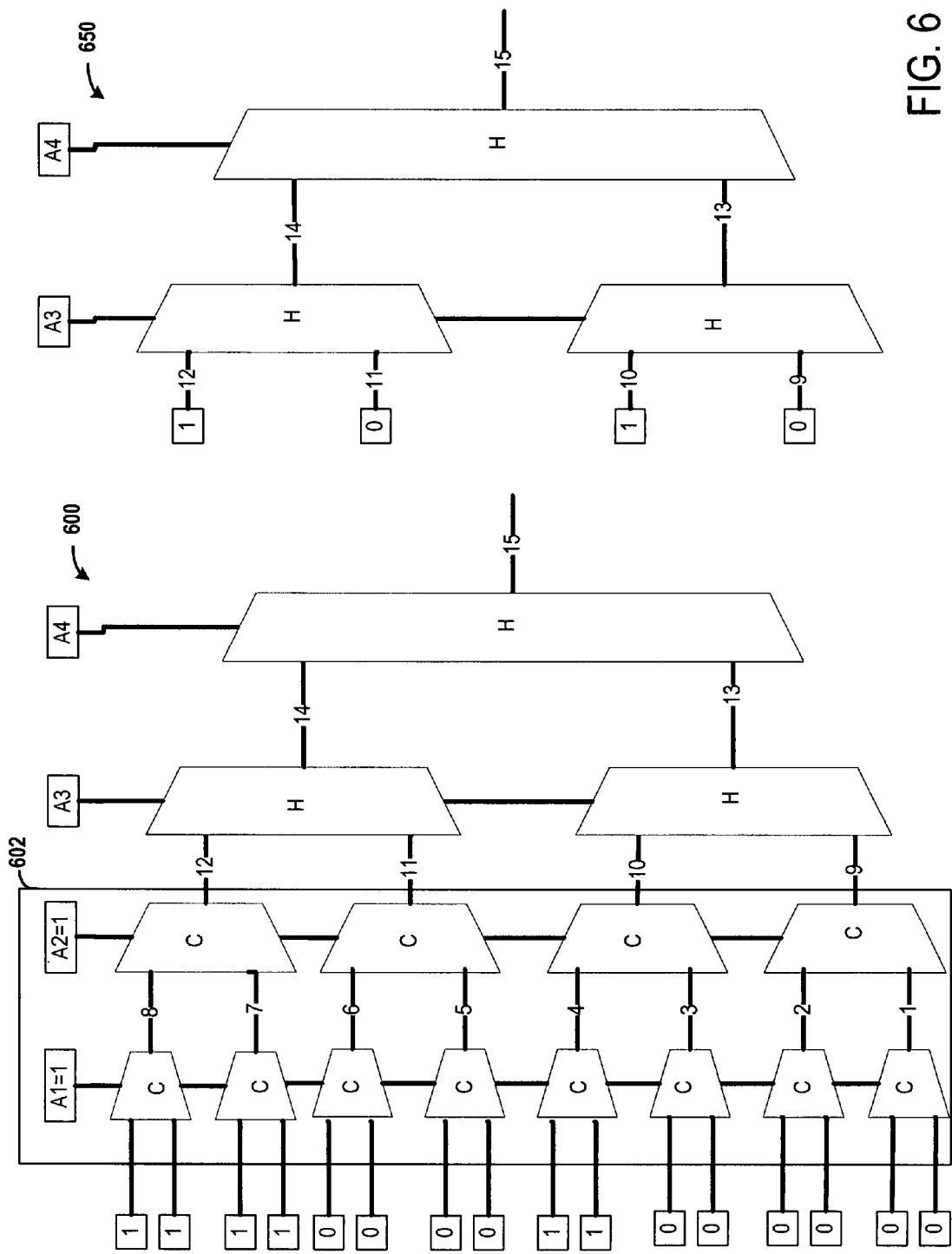
FIG. 6 shows an example LUT-based CLB block in which multiple inputs are not used.

FIG. 6 shows an example LUT-based CLB block in which inputs are not used. Block 602 includes multiplexers controlled by inputs A1 and A2. If it is determined that A1 and A2 are static/not used, the process may utilize this information to create a number of cool multiplexers. More specifically, the configuration bits may be selected such that each multiplexer within block 602 may be considered cool. This is shown by the diagram 600. In terms of dynamic power consumption, the block functions as shown by diagram 650. Thus, the number of hot multiplexers may be set to only three. This type of information may also be used during the synthesis of the design. For instance, if the design has two inputs that are don't cares, the synthesis tools may select inputs A1 and A2 to correspond to the don't cares so as to reduce the number of hot multiplexers.

Figure 7:
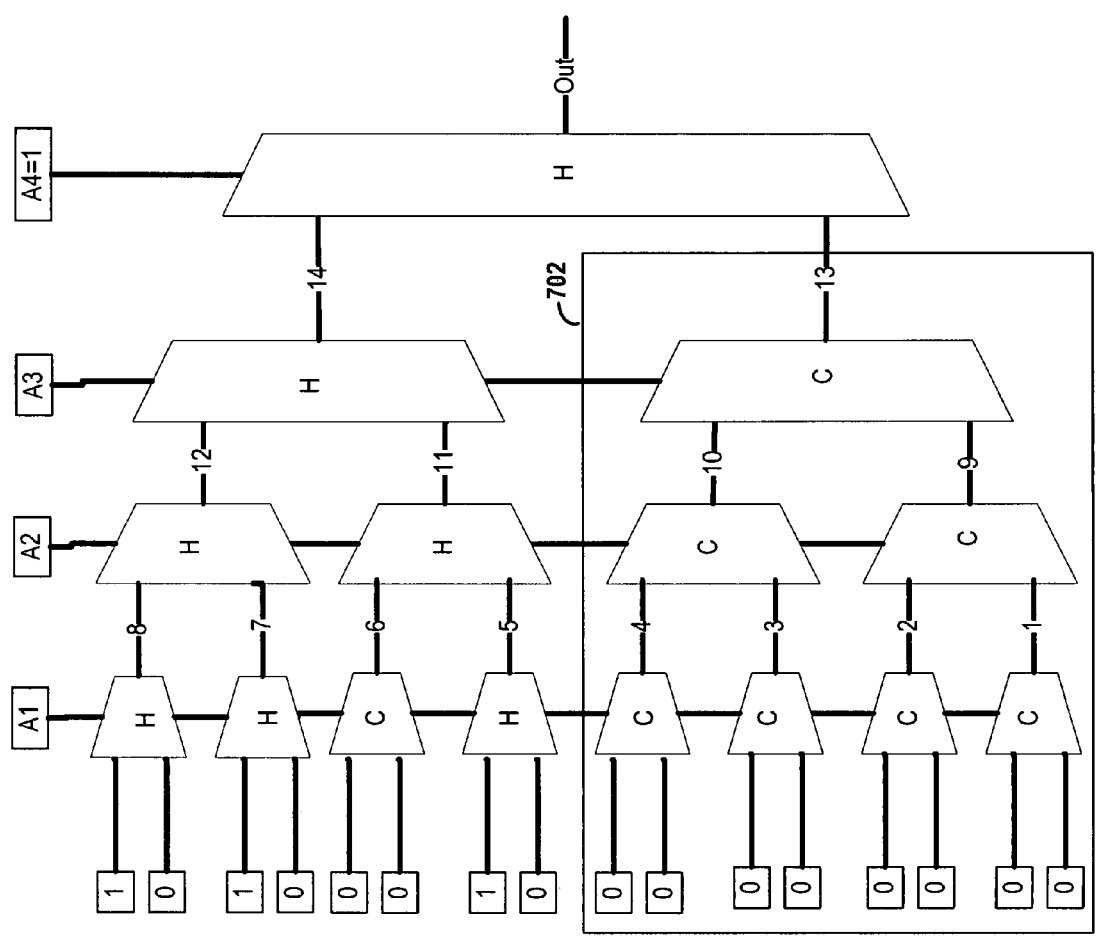
FIG. 7 is a block diagram depicting a representation of a programmed LUT where a single input is not used.

FIG. 7 shows an example LUT-based CLB block in which a single input is not used. In this instance, the unused input is A4. Accordingly, if A4 is set to a static value, only one of the two immediately connected multiplexers is relevant to the output value. Thus, an entire MFFC corresponding to the irrelevant multiplexer may be made cool, as shown by block 702. This results in seven multiplexers being cool. This information may also be used during synthesis of the design to select which input is assigned the static value.

One skilled in the art would recognize that the methodology applied in connection with the various embodiments described herein would be applicable to various sizes and configurations of CLB blocks. As such, changes necessary to implement the invention for different CLB blocks are deemed to be within the scope of this invention.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not necessarily imply any order of the steps. Trademarks are the property of their respective owners.

What is claimed is:

1. A processor-based method for processing an integrated circuit design, the method comprising:
   utilizing a processor for:
   representing the design in a memory with a plurality of programmable look-up-table (LUT) blocks, each LUT block having a plurality of logic devices, a plurality of inputs and a plurality of configuration bits that implement a function that is responsive to the inputs;
   for a LUT block of the plurality of programmable LUT blocks, identifying one or more of the configuration bits that have don't care conditions;
   determining a plurality of dynamic power states for a first level of the logic devices in the LUT block as a function of each identified configuration bit that has the don't care condition;
   determining at least one dynamic power state for a second level of the logic devices in the LUT block as a function of the determined dynamic power states for the first level of the logic devices;
   wherein the dynamic power state of each of the logic devices in the first and second levels indicates whether an output of the logic device changes in response to changing one or more of the inputs of the LUT block, and further indicates whether the changes of the output depend on the identified configuration bits that have the don't care conditions;
   selecting a respective value for each identified configuration bit of the LUT in response to the determined dynamic power states of the logic devices in the first and second levels;
   wherein the selecting reduces occurrence of changes of the outputs of the logic devices in the first and second levels caused by changing one or more of the inputs of the LUT block; and
   storing into the design, the respective value for each identified configuration bit.

2. The method of claim 1, wherein the don't care conditions one of include a satisfiability don't care condition and an observability don't care condition.

3. The method of claim 1, wherein the first level and second level of logic devices are multiplexers having two data inputs, a selection input and the output.

4. The method of claim 1, wherein the step of selecting a value includes determining estimated static power consumption for potential values of each identified configuration bit that has the don't care condition.

5. The method of claim 1, wherein the representing, identifying, determining for a first level of logic devices, determining for a second level of logic devices, selecting, and storing steps are repeated for different LUT blocks.

6. The method of claim 1, wherein the representing, identifying, determining for a first level of logic devices, determining for a second level of logic devices, selecting, and storing steps are repeated for the same LUT block.

7. The method of claim 1, wherein the determining of the plurality and the at least one dynamic power states of each logic device in the first and second levels includes determining if the inputs to the logic device are the same, if the inputs to the logic device are different, and if one or more of the inputs to the logic device depends on the identified configuration bits that have the don't care conditions.

8. The method of claim 1, wherein the representing, identifying, determining for a first level of logic devices, determining for a second level of logic devices, selecting, and storing steps are performed after the design has been placed and routed.

9. The method of claim 1, wherein placement, routing and functionality of the design remains constant through the representing, identifying, determining for a first level of logic devices, determining for a second level of logic devices, selecting, and storing steps.

10. The method of claim 1, further comprising the step of sorting the logic devices into three levels, wherein the first level of logic devices corresponds to primary input logic devices, the second level of logic devices corresponds to intermediate logic devices and a third level of logic devices corresponds to primary output logic devices.

11. The method of claim 10, further comprising the step of propagating determined dynamic power states of levels of logic devices that are not in the first level to logic devices in the first level.

12. An apparatus for processing an integrated circuit design, the apparatus comprising:
   means for representing the design in a memory with a plurality of programmable look-up-table (LUT) blocks, each LUT block having a plurality of logic devices, a plurality of inputs and a plurality of configuration bits that implement a function that is responsive to the inputs;
   means for identifying one or more of the configuration bits that have don't care conditions for a LUT block of the plurality of programmable LUT blocks;
   means for determining a plurality of dynamic power states for a first level of the logic devices in the LUT block as a function of each identified configuration bit that has the don't care condition;
   means for determining at least one dynamic power state for a second level of the logic devices in the LUT block as a function of the determined dynamic power states for the first level of the logic devices;
   wherein the dynamic power state of each of the logic devices in the first and second levels indicates whether an output of the logic device changes in response to changing one or more of the inputs of the LUT block, and further indicates whether the changes of the output depend on the identified configuration bits that have the don't care conditions;
   means for selecting a respective value for each identified configuration bit of the LUT in response to the determined dynamic power states of the logic devices in the first and second levels;
   wherein the means for selecting reduces occurrence of changes of the outputs of the logic devices in the first and second levels caused by changing one or more of the inputs of the LUT block; and
   means for storing, into the design, the respective value for each identified configuration bit.

13. An article of manufacture, comprising:
a processor-readable storage device configured with processor executable instructions for generating an implementation of an electronic circuit design by performing the steps including,
representing the design in a memory with a plurality of programmable look-up-table (LUT) blocks, each LUT block having a plurality of logic devices, a plurality of inputs and a plurality of configuration bits that implement a function that is responsive to the inputs;
for a LUT block of the plurality of programmable LUT blocks, identifying one or more of the configuration bits that have don't care conditions;
determining a plurality of dynamic power states for a first level of the logic devices in the LUT block as a function of each identified configuration bit that has the don't care condition;
determining at least one dynamic power state for a second level of the logic devices in the LUT block as a function of the determined dynamic power states for the first level of the logic devices;
wherein the dynamic power state of each of the logic devices in the first and second levels indicates whether an output of the logic device changes in response to changing one or more of the inputs of the LUT block, and further indicates whether the changes of the output depend on the identified configuration bits that have the don't care conditions;
selecting a respective value for each identified configuration bit of the LUT in response to the determined dynamic power states of the logic devices in the first and second levels;
wherein the selecting reduces occurrence of changes of the outputs of the logic devices in the first and second levels caused by changing one or more of the inputs of the LUT block; and
storing, into the design, the respective value for each identified configuration bit.

14. The article of manufacture of claim 13, wherein the don't care conditions include a satisfiability don't care condition and an observably don't care condition.

15. The article of manufacture of claim 13, wherein the step of selecting a value includes determining estimated static power consumption for potential values of each identified configuration bit that has the don't care condition.

16. The article of manufacture of claim 13, wherein the determining of the plurality and the at least one dynamic power states of each logic device in the first and second levels includes determining if inputs to the logic device are the same, if the inputs to the logic device are different, and if one or more of the inputs to the logic device depends on the identified configuration bits that have the don't care conditions.

17. The article of manufacture of claim 13, wherein the representing, identifying, determining for a first level of logic devices, determining for a second level of logic devices, selecting, and storing steps are repeated for different LUT blocks.

18. The article of manufacture of claim 13, wherein placement, routing and functionality of the design remains constant through the representing, identifying, determining for a first level of logic devices, determining for a second level of logic devices, selecting, and storing steps.

19. The article of manufacture of claim 13, further including the step of sorting the logic devices into three levels of logic devices, wherein a first level of logic devices corresponds to primary input logic devices, a second level of logic devices corresponds to intermediate logic devices and a third level of logic devices corresponds to primary output logic devices.

20. The article of manufacture of claim 19, further including the step of propagating determined dynamic power states of levels of logic devices that are not in the first level to logic devices in the first level.

* * * * *